June 4, 1968 W. C. STOCKMAN 3,386,175

GAUGE FOR USE IN SETTING FORMS

Original Filed Jan. 2, 1962 4 Sheets-Sheet 1

INVENTOR.
WILLIAM C. STOCKMAN

BY Schneider, Patton, Rieber, Lee & Utecht

ATTORNEYS

INVENTOR.
WILLIAM C. STOCKMAN
BY Fulwider, Patton, Rieber, Lee + Utecht
ATTORNEYS

INVENTOR.
WILLIAM C. STOCKMAN

BY Schneider, Patton, Rieber, Lee & Utecht

ATTORNEYS

INVENTOR.
WILLIAM C. STOCKMAN
BY
Fulwider, Patton, Rieber, Lee & Utecht
ATTORNEYS United States Patent Office 3,386,175

Patented June 4, 1968

3,386,175

GAUGE FOR USE IN SETTING FORMS

William C. Stockman, Fountain Valley, Calif., assignor to Retlaw Enterprises, Inc., Burbank, Calif., a corporation of California Original application Jan. 2, 1962, Ser. No. 163,396, now Patent No. 3,235,966, dated Feb. 22, 1966. Divided and this application Aug. 23, 1965, Ser. No. 481,820
3 Claims. (Cl. 33—174)

ABSTRACT OF THE DISCLOSURE

A gauge for establishing the locations of longitudinally spaced, successive stations on a elongated body relative to a vertical plane and relative to a horizontal plane, and also for establishing the angular inclination of the stations about a longitudinal axis, the gauge including a frame for attachment to the body; a first arm pivoted to the frame for establishing the angular inclination of the frame; and a second arm coupled to the first arm in such a way that one extremity of the second arm can be moved along horizontal and vertical axes to provide indications respecting the proximity of such extremity to the vertical and horizontal planes of interest.

This is a divisional of my patent application Ser. No. 163,396, filed Jan. 2, 1962, now U.S. Patent No. 3,235,966.

The present invention relates generally to a gauge for use in setting forms, but more particularly to a gauge by which an adjustable concrete form can be properly set in accordance with prior calculations.

In the making of concrete rails and the like, as for instance in the construction of monorail transit systems, it is necessary to provide contiguously arranged sections of concrete rail which are relatively large. The rail of a monorail system is normally formed with enlarged upper and lower portions joined together by an intermediate portion. Depending upon the size of the proposed transit system, the enlarged portions of such rail might range from one foot to three feet in width.

The aforementioned enlarged upper and lower portions provide a cross sectional configuration on the order of an I section. However, due to the fact that a monorail must be formed with turns in addition to sections of incline and decline, it is necessary that all of these features be taken into account when the various sections of concrete rail are poured. Thus an adjustable form is usually used so that it can be adjusted in accordance with the desired radius of curvature, in either the horizontal or the vertical plane.

It is an object of the present invention to provide a gauge for use in setting forms in accordance with prior calculations.

Another object of this invention is to provide a gauge for use in adjusting the relative position of adjacent sections of an adjustable form.

Another object of the present invention is to provide a gauge as characterized above which can be used in conjunction with a line-of-sight instrument on the order of a level, transit or the like.

Another object of the present invention is to provide a gauge as characterized above which can be used for adjusting various sections of a form with respect to horizontal, vertical and angular relative positions.

Another object of the present invention is to provide a gauge as characterized above which is easily and quickly mountable and demountable on an adjustable form at predetermined locations thereon.

Another object of this invention is to provide a gauge as characterized above which is simple and inexpensive to manufacture, and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figures 1, 2, 3, 4, 5, 6, 7, 8:
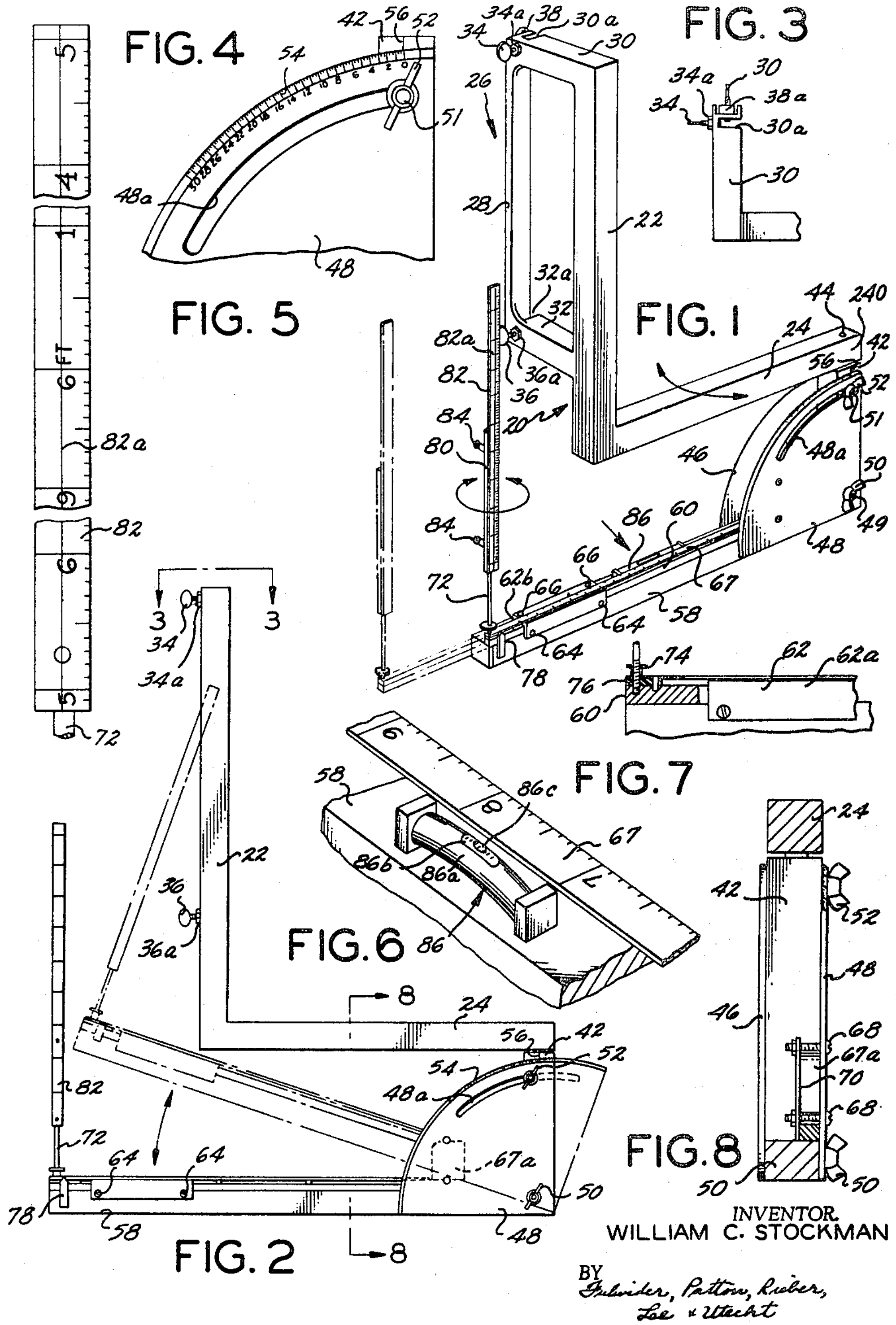
FIGURE 1 is a perspective view of a gauge according to the subject invention.
FIGURE 2 is a side elevational view of the gauge of FIGURE 1.
FIGURE 3 is a fragmentary top view of the gauge taken substantially along line 3—3 of FIGURE 2.
FIGURE 4 is a fragmentary side elevational view of the vertical linear measurement portion of the gauge of FIGURE 1.
FIGURE 5 is a fragmentary side elevational view of the angular adjustment means and scale therefor.
FIGURE 6 is a fragmentary perspective view of the arm of the device of FIGURE 1.
FIGURE 7 is a fragmentary sectional view of the end of the arm.
FIGURE 8 is a sectional view taken substantially along line 8—8 of FIGURE 2.

Referring to FIGURE 1 of the drawings the embodiment chosen for illustration of the present invention comprises a generally L-shaped frame 20 having a vertical member 28 and a pair of spaced horizontal members 30 and 32.

For attaching the gauge to the form to be adjusted as will herinafter be explained in greater detail, there is provided a cutout 30*a* in the upper horizontal member 30 and a corresponding aligned cutout 32*a* in the lower horizontal member 32. These cutouts are formed immediately adjacent the vertical member 28 as shown most clearly in FIGURE 3 of the drawings.

Fastening thumb screws 34 and 36 are threadably mounted in the upper and lower end portions of vertical member 28, there being a fastening nut on each of such thumb screws as shown at 34*a* and 36*a* respectively. For further adjusting the position of the gauge on the form, as will hereinafter be explained in detail, there are provided thumb screws 38 and 40 each of which is threadedly mounted in vertical member 28 at substantially right angles to the aforementioned screws 34 and 36. Nuts 38a and 40a are provided on thumb screws 38 and 40 respectively for firmly fastening such screws in their adjusted positions. Each of the thumb screws 34, 36, 38 and 40 is mounted in an appropriately threaded through opening in the vertical member 28 for operation within the respective one of the cutouts or slots 30a and 32a in the horizontal members 30 and 32.

Pivotally attached to the underside of end portion 24a of horizontal arm 24 is a mounting post 42, there being a bolt 44 extending through a suitable transverse opening in the member 24 and threadedly engaging the upper end of mounting post 42. Such bolt 44 is sufficiently loose to permit of pivotal movement between post 42 and member 24.

Adjustably carried by mounting post 42 is a pair of oppositely disposed adjustable gusset plates 46 and 48 which are formed with aligned through openings for receiving a bolt 49. Gusset plates 46 and 48 are arranged on opposite sides of post 42 to permit bolt 49 to extend through such openings in the gussets and an aligned through opening formed transversely on the lower portion of post 42. A thumb screw 50 is provided for bolt 49. Gusset plates 46 and 48 are also formed with aligned arcuate slots as shown at 48a on plate 48, the radius of such slots being constant about the bolt 49. The upper end portion of mounting post 42 is formed with a through opening for receiving a bolt 51 which also extends through the arcuate slots in gusset plates 46 and 48. A thumb screw 52 is provided for such bolt for permitting quick and easy adjustment of the relative positions of plates 46 and 48 and post 42, as will hereinafter be explained in greater detail.

Suitable indicia 54 representing angular displacement is provided along the outer arcuate edge of member 48. For cooperation with such indicia, there is provided a vertical reference mark 56 on post 42. The arcuate edge of plate 48 which carries the indicia 54 may be beveled, if desired, in order to effect a closer association between such indicia and the reference mark 56.

Firmly fixed to and mounted between the gusset plates 46 and 48 is a measurement arm 58. Slidably mounted on the upper surface of arm 58 is a slide bar 60, there being suitable mounting means in the form of an inverted U-shaped bracket 62 for retaining slide bar 60 on the upper surface of arm 58. Bracket 62 may take substantially any desired form, but is shown in the drawings as comprising an elongated L-shaped bracket member 62a fastened to one side of arm 58 by screws 64, and a spacer 62b firmly mounted between the end of L-shaped member 62a and the upper surface of arm 58 by screws 66.

Although any suitable linear measurement means may be employed in the present invention, as will hereinafter become apparent, I have chosen to use a flexible steel scale 67 having a housing 67a which is suitably fastened to gusset plate 48 by a pair of screws 68 and a mounting plate 70. Scale 67 is of the type formed of an elongated strip of flexible steel which is provided with appropriate linear measurement indicia. Such flexible strip is stored in a relatively tightly wound coil within housing 67a and is biased to its coiled or retracted position within such housing.

The free end of scale 67 is firmly fastened to the forward end of slide bar 60 by a vertical post 72 the lower end of which is threaded and extends through an appropriate through opening in the scale and into a suitably threaded aperture in member 60. A fastening nut 74 is provided on the threaded lower end of post 72 to retain the various members in assembled relation as shown in FIGURE 7 of the drawings. A spacer 76 may be interposed between the forward end of slide bar 60 and the adjacent end of the scale 67 to compensate for the thickness of the L-shaped mounting bracket 62a, in the event it is desired to have scale 67 disposed above bracket 62a, as shown in FIGURE 1.

A pointer or indicator 78 is mounted on the side of an arm 58 and extends upwardly adjacent the flexible scale 67.

Slidably mounted on post 72 is a bracket 80 carrying a vertically disposed linear measurement scale 82. Bracket 80 is provided with suitable finger adjusting screws 84 to facilitate vertical positioning of scale 82 as will hereinafter be explained. Scale 82 is provided with a substantially centrally located sighting line 82a at right angles to the usual linear measurement indicia.

It should be noted that substantially any desired linear measurement members may be used in place of scale 67 and 82. Such members may be provided with any desired graduations for making linear measurements. The scales 67 and 82 in the illustrated embodiment carry graduations of inches and fractions thereof.

As shown most clearly in FIGURE 6 of the drawings, a leveling device 86 is also mounted on slide bar 58. Such device may take substantially any desired form, although it is shown in the drawings as comprising a tubular member 86a at least a portion 86b of which is transparent. Tubular member 86a is almost entirely filled with liquid to provide an air bubble 86c which has a central position for indicating when the leveling device is in a horizontal position.

The operation of the subject form setting gauge will next be explained.

Figures 9, 10, 11, 12, 13:
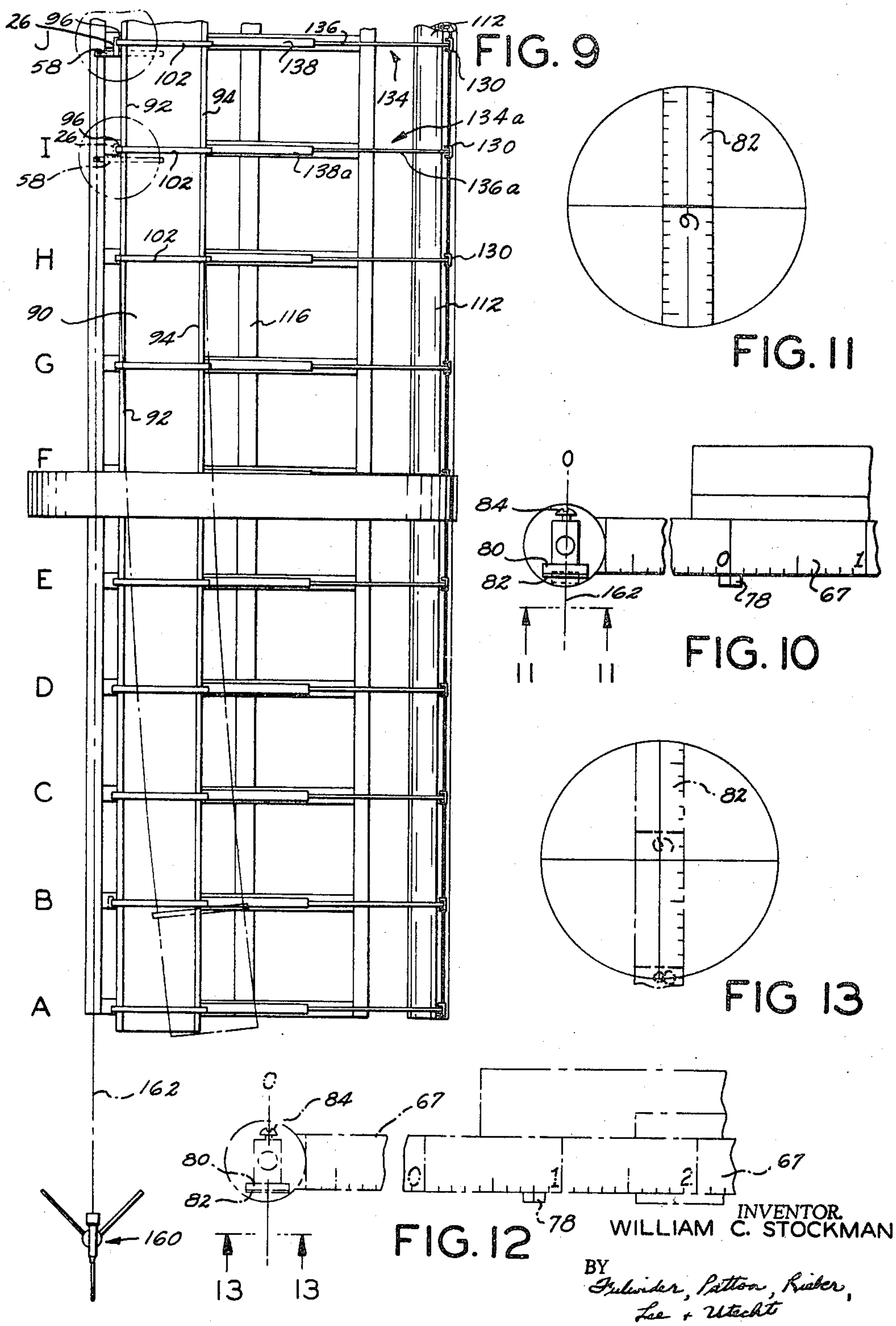
FIGURE 9 is a top plan view of an adjustable form.
FIGURE 10 is a fragmentary top plan view of the end of the arm of the gauge properly adjusted for station J of FIGURE 9.
FIGURE 11 is a view through the line-of-sight device at location 10 of FIGURE 9.
FIGURE 12 is a fragmentary top plan view of the end of the arm of the gauge properly adjusted for section I of of FIGURE 9.
FIGURE 13 is a view through the line-of-sight device at location 12 of FIGURE 9.
Figures 16, 17:
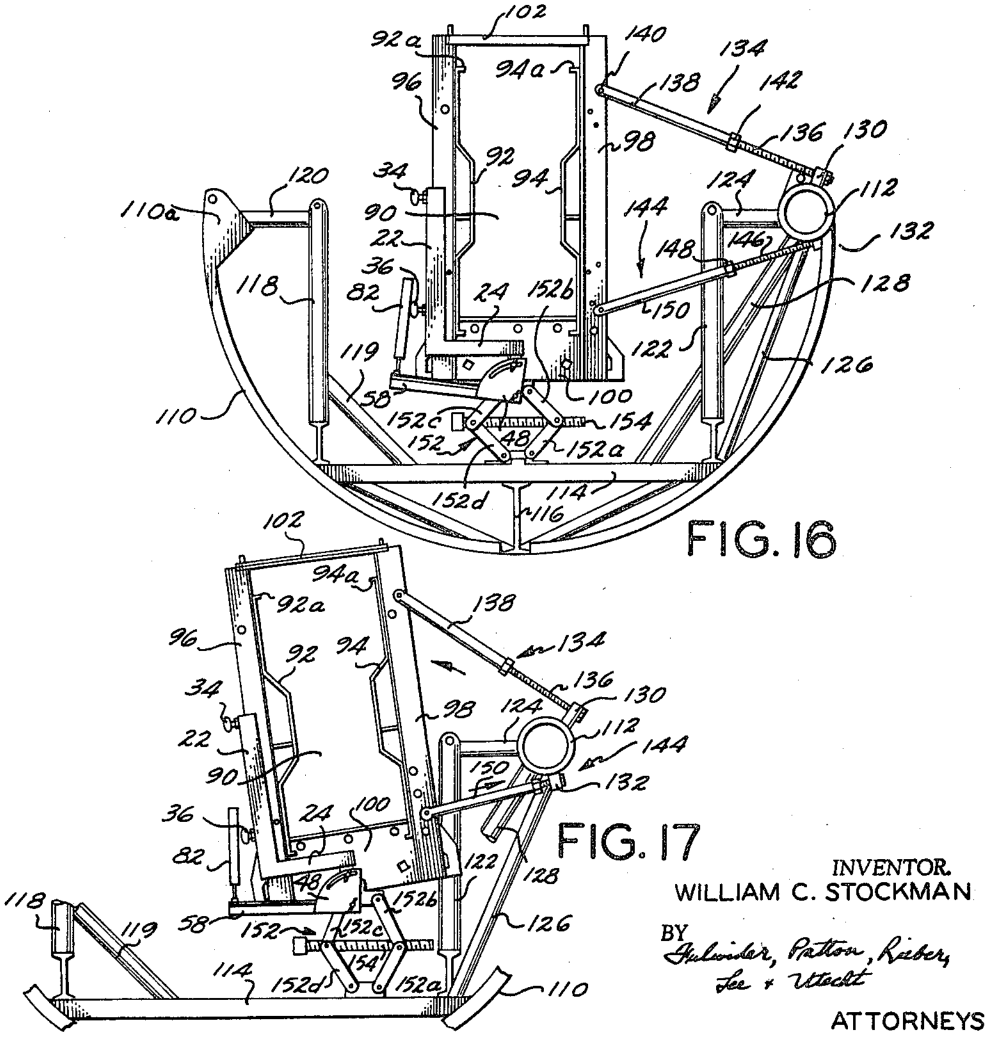
FIGURE 16 is a transverse sectional view through the form of FIGURE 9.
FIGURE 17 is a view similar to Figure 16 following adjustment of the form.

Referring to FIGURES 9, 16 and 17, there is shown therein an adjustable concrete form for use in making sections of rail or track for a monorail system. Although the present invention is in no way limited to the making of vehicle tracks or rails, or even to the particular type of adjustable form illustrated, the subject gauge is shown in this environment primarily because of the large number of adjustments which have to be made to the form to provide the desired rail. That is, due to the various turns, inclines, declines, "banked" or tilted sections which have to be considered in forming a rail, this environment is believed to show the versatility of the subject invention.

As shown most clearly in FIGURES 16 and 17, the form or mold itself is constructed generally of relatively large sheets of steel in the form of an elongated trough or channel 90. Side forms such as shown at 92 and 94 are positioned within the elongated channel 90 to provide the desired cross section for the rail. Each of such side forms 92 and 94 is provided with an elongated upper flange as shown at 92a and 94a respectively, for defining the upper end of the rail as cast in the form.

The section of rail is cast in an inverted position such that the top surface of the rail when ultimately assembled and put in operation is initially formed in the mold against the bottom wall thereof. This has a direct bearing on the way in which the various curvatures for the section of rail are calculated, and also the way in which the above-described gauge is ultimately used for setting the form, as will be hereinafter described.

At predetermined intervals or spaced transverse sections along the length of the form, the sheet metal sides and bottom are reinforced with angle members 96, 98 and 100 for providing sufficient strength and rigidity to the form for withstanding the heavy weight of the concrete poured into the form. As shown most clearly in FIGURES 16 and 17, the angle members 96 and 98 support the substantially parallel opposite side walls of the form while the larger angle member 100 provides support for the bottom of the form. Extended between the upper end portions of the angle members 96 and 98 is a support member 102 which aids in preventing the heavy concrete from pushing the opposite sides of the mold out of their substantially parallel relative position.

It should be particularly noted that angle members 96, 98 and 100 are mounted on the sheet metal sides of the form at a given transverse plane, there being a similar set of angle members at predetermined spaced intervals along the longitudinal length of the form.

The entire mold may be supported by any desired means, the only requirement being that it be adjustably supported so that the relative horizontal and vertical positions and the relative angular disposition of the various cross sections of the form can be suitably varied. The means shown in the drawings for accomplishing this is best shown in FIGURES 16 and 17 and comprises a semi-circular supporting frame 110 to one end of which is fastened a large tube or pipe 112 which is used as a reference for adjusting the relative positions of the various sections of the form as will hereinafter be explained. At the other end of the frame member 10 is a mounting pad 110*a*.

A transverse supporting member 114 is provided as a chord for the semi-circular frame 110 at each of the reinforced adjustment stations of the mold. A structural I-beam 116 may be provided between the semi-circular frame 110 and the mounting members 114 to provide the necessary strength and support for the latter. Additional structural members such as shown at 118, 119, 120, 122, 124, 126 and 128 may be provided, as desired, to provide the necessary rigidity and strength for the mold. The details of such structural members can be varied as desired in accordance with good engineering principles.

At each adjustment station of the mold, namely at the transverse cross section having the angle members 96, 98 and 100, there is provided on pipe 112 a pair of fastening tabs 130 and 132. Extending from tab 130 to the upper portion of angle member 98 is an adjustment mechanism 134 in the form of a threaded rod 136 one end of which is non-rotatably fastened to tab 130 and a tubular member 138 one end of which is firmly fixed to angle member 98 as at 140. Rod 136 telescopically fits within tubular member 138, and a fastening nut 142 is threadedly mounted on rod 136 for engagement with the end of tubular member 138. Interposed between the lower portion of angle member 98 and tab 132 on pipe 112 is a similar adjustment mechanism 144 comprising a threaded rod 146 carrying a nut 148, and a tubular member 150 for telescopically receiving rod 146.

Immediately beneath the concrete mold for adjusting the vertical position thereof, there is provided a jack 152 which may take substantially any desired form. The jack 152 illustrated in the drawings comprises four pivotal levers 152*a*, 152*b*, 152*c* and 152*d* as shown in FIGURES 16 and 17. An adjustment screw 154 is provided for moving the levers to effect a "scissors action" for raising or lowering the particular adjustment section of the mold. It will be noted that jack 152 firmly rests on mounting member 114 to provide a firm support for the mold.

Although it will hereinafter be explained in detail, it should be noted that the adjustment mechanisms 134 and 144 are operable with respect to the particular adjustment station to move the latter in the horizontal direction and to pivot or rotate the same as desired. The fastening nuts 142 and 148 enable such adjustment mechanisms to be secured in a given position following the desired adjustment. The jack 152 on the other hand, is operable for varying the vertical position of the particular station of the form.

Initially, of course, it is necessary for the proper engineering calculations to be made for determining, in accordance with the desired size and shape of the resulting monorail, the necessary relative positions of the adjustment stations of the mold. In this regard, although not mandatory for successful operation of the present invention, it is preferable if the above-described gauge is constructed in accordance with the location of the center of gravity of the vehicles to be used on the rail. This feature will be explained in greater detail, suffice for the present to note that the aforementioned engineering calculations can be related to such center of gravity as a reference for the various curvatures to be provided in the rail.

Figure 14:
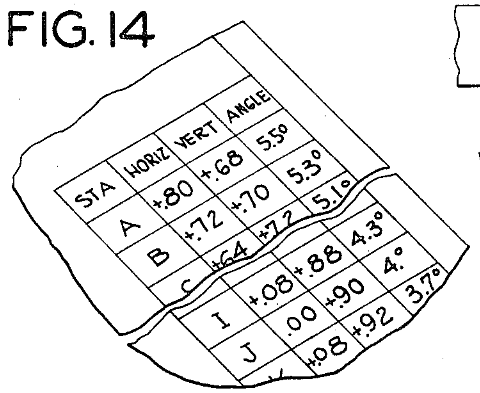
FIGURE 14 is a fragmentary view of a sheet of calculations.
Figure 15:
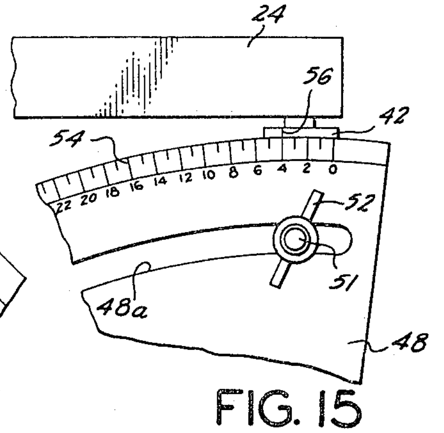
FIGURE 15 is a fragmentary side elevational view of the angle adjustment means of the gauge of FIGURE 1.

Thus, after the shape of each section of rail has been calculated and all of the relative positions of the various adjustment stations of the mold or form determined, a tabulation as shown in FIGURE 14 can be provided. Referring thereto, it is seen that each adjustment station of the form is identified with a letter as shown in the first column of the tabulation. The second column shows the horizontal position of the particular station from a predetermined vertical reference plane.

The third column of the tabulation of FIGURE 14 indicates the vertical distance of the various adjusting stations from a predetermined horizontal plane.

The last or fourth column of the tabulation indicates the angle of disposition of each adjusting station with respect to a vertical line.

Once the entire tabulation has been completed, it is then possible to adjust accordingly the form shown in FIGURES 9, 16 and 17. To accomplish this, the above-described setting gauge is initially attached to one of the adjusting stations of the form. For instance, it may be desirable to begin with an adjusting station, one of the linear relative positions of which is noted on the tabulation as zero. Such a station might be that designated in FIGURE 14 as station J. Referring to FIGURE 9 of the drawings, the various stations of the form have been suitably identified. Thus, station J is shown at the top of FIGURE 9 and may or may not be at the end of the form.

Thus, the setting gauge is fastened to the angle member 96 at station J as shown in FIGURE 16. For this purpose, member 96 is provided with suitable through openings in the flange portion thereof which extends outwardly from the form. The mounting frame 26 of the setting gauge is fastened to member 96 such that the cutouts 30*a* and 32*a* of horizontal members 30 and 32 receive the flange. Thumb screws 34 and 36 are then turned inwardly for engagement with the aforementioned openings in said flange. The thumb screws 38 and 40 can then be adjusted so as to properly position the entire gauge on the particular adjustment station. In this regard, the dimensions of the setting gauge should be such that mounting bolt 49, which provides the pivot for arm 58 with respect to mounting post 42, coincides with the center of gravity of the vehicle to be operated on the rail. As above-explained, the position of the gauge is then properly related to the above-mentioned engineering calculations which were also based on the center of gravity of the proposed vehicle.

The gauge, either before or after mounting thereof at station J of the form, is adjusted in accordance with the tabulated angular displacement indicated by the tabulation of FIGURE 14. Thus, thumb nut 52 of the gauge is loosened and the gusset plates 46 and 48 together with measuring arm 58 are rotated about pivot bolt 49 until the 4 degree graduation of the indicia 54 on plate 48 is in alignment with the reference mark 56 on the upper portion of mounting post 42. The nut 52 is then tightened so as to retain the gauge in such pre-set position as shown in FIGURE 16.

By suitable adjustment of the mechanisms 134 and 144 extending from pipe 112 to angle member 98, the entire adjustable station of the form is tilted until, as shown in FIGURE 17, the level indicator 86 of FIGURE 6 indicates that the measurement arm 58 is disposed in a horizontal position. At this time, the station J will be disposed at an angle of 4 degrees to the verical. As shown most clearly in FIGURE 17, such adjustment is effected by shortening the adjusting mechanism 144 and lengthening the adjusting mechanism 134 the required amount.

After the particular section in question has been set to the proper angular position, a line-of-sight instrument such as a level or transit 106 is set up a given distance from the form. The viewing piece is level in the usual manner so as to afford a horizontal line-of-sight indicated by broken line 162 which extends adjacent and parallel to the length of the form.

With the line-of-sight instrument 160 so set up, it is then necessary to adjust the setting gauge by manually varying he position of the slide bar 60 on member 58 until the centrally located vertical line 82 on scale 82 coincides with the vertical hair line in the eye piece of the instrument 160. Referring to FIGURE 14, it will be seen that the gauge is now set in accordance with the horizontal tabulation for station J as shown in FIGURE 10.

In like manner, the vertical scale 82 is then adjusted until the horizontal hair line of the eye piece of the instrument 160 coincides with the graduation 90 on scale 82. When this has been accomplished as shown in FIGURE 11 of the drawings, the gauge will be properly set for providing the necessary reference for adjustment of succeeding adjustment stations of the form. That is, in accordance with the tabulation of FIGURE 14, station J of the form is disposed at an angle of 4 degrees to the vertical and the gauge is set to a horizontal position of .00 and to a vertical position of .90.

It should be noted at this point that in the event the indicator 78 on measurement arm 58 is not adjacent the zero graduation of scale 67, this should be of no immediate concern other than to note the graduation which is adjacent thereto. More specifically, the actual reading of indicator 78 at scale 67 is not of primary importance since only the difference between the dimensions at adjacent stations is of concern. The same is true for the position of vertical scale 82. An adjustable indicator can be provided if desired for the scale 67 to enable the operator to set the indicator to the proper graduation when the vertical hair line of the eye piece of the instrument 160 is aligned with mark 82a of scale 82. The setting gauge is so constructed that the vertical scale 82 does not require an indicator of any kind since the entire scale is adjustably mounted on post 72.

After the gauge has been properly adjusted at the first station (station J), it is then removed therefrom and fastened to one of the next adjusting stations, as for instance station I immediately adjacent thereto. The gauge itself, of course, is fastened to the flange of the angle member 96 at station I in the same manner as above-described with respect to fastening thereof at station J.

Either before or after mounting of the setting gauge at station I, several adjustments should be made thereto. The first of such adjustments is to set measurement arm 58 at the proper angle in accordance with the tabulation of FIGURE 14. That is, as above-explained with respect to station J, the thumb screw 52 is loosened to permit the gusset plates 46 and 48 and the various components attached thereto to pivot on bolt 49. In this regard, it should be noted that such pivot bolt 49 also represents the center of gravity of the proposed vehicle to be used on the rail at station I as well as at station J as above-explained.

Referring to the tabulation of FIGURE 14, it is seen that the gauge should be adjusted such that the 4.3 degree graduation of the indicia 54 is aligned with the reference mark 56. With the gauge properly positioned at adjusting station I, the adjustment mechanisms 134a and 144a of FIGURE 9 are varied to cause measurement bar 58 of the gauge to assume a horizontal position as indicated by the leveling device 86. Such adjustment, of course, is similar to that described above with respect to station J. After measurement arm 58 is thus positioned, station I of the form is at the proper angular position with respect to the vertical and also with respect to the previously adjusted station, here station J.

The second adjustment to be made to the gauge is to move slide bar 60 a distance corresponding to the tabulation in the "horizontal" column of FIGURE 14. That is, in the event pointer 78 of the gauge was positioned at the .00 graduation of scale 67 following adjustment of the gauge at station J, then it is merely necessary to pull out slide bar 60 until the .08 graduation of scale 67 is adjacent indicator 78. If indicator 78 was not positioned adjacent the zero graduation, as is permissible as above-explained, it is then necessary that the slide bar be pulled out sufficiently to change the relative location of the scale 67 and pointer 78 by an amount equal to .08.

The aforementioned adjustment mechanisms 134a and 144a of FIGURE 9 are then manipulated until the vertical line 82a of scale 82 coincides with the vertical hair line of the eye piece of instrument 160 as indicated in FIGURE 13 of the drawings. It should be noted that throughout the performance of all of the adjustment operations for the form, the instrument 160 must remain in its position as originally established while the gauge was mounted at the first adjusting station, here station J.

Once the adjusting station I has been suitably moved in the horizontal direction to cause vertical line 82a on scale 82 to coincide with the vertical hair line of the eye piece of instrument 160, it is then necssary to actuate the jack 152 immediately beneath station I to cause the .88 graduation on scale 82 to coincide with the horizontal hair line as shown in FIGURE 13. When this has been accomplished, the station I is then properly positioned in accordance with the station I tabulations as shown in FIGURE 14.

Figure 18:
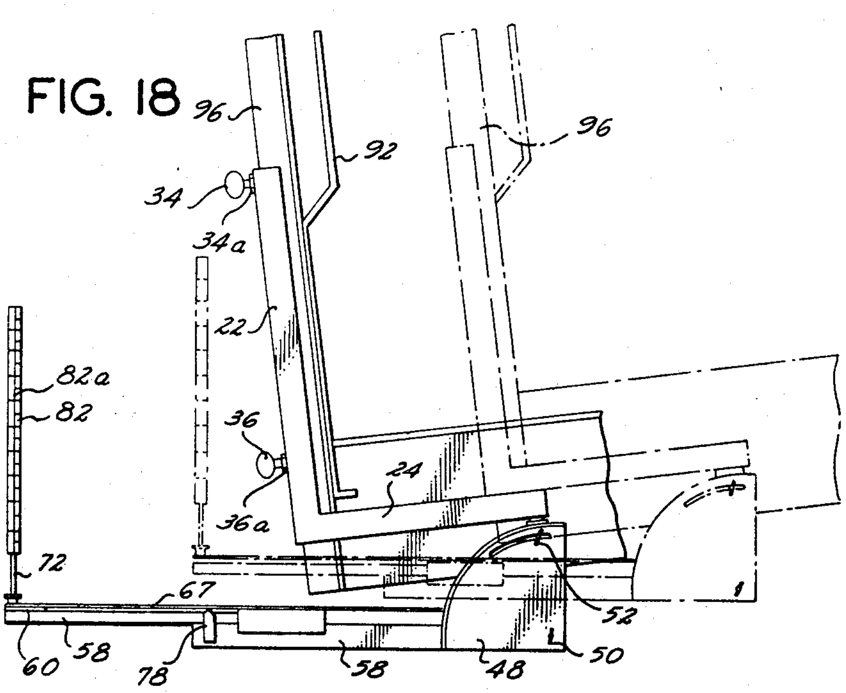
FIGURE 18 is a side elevational view of the gauge of FIGURE 1 showing its various positions during adjustment of the form.
Figure 19:
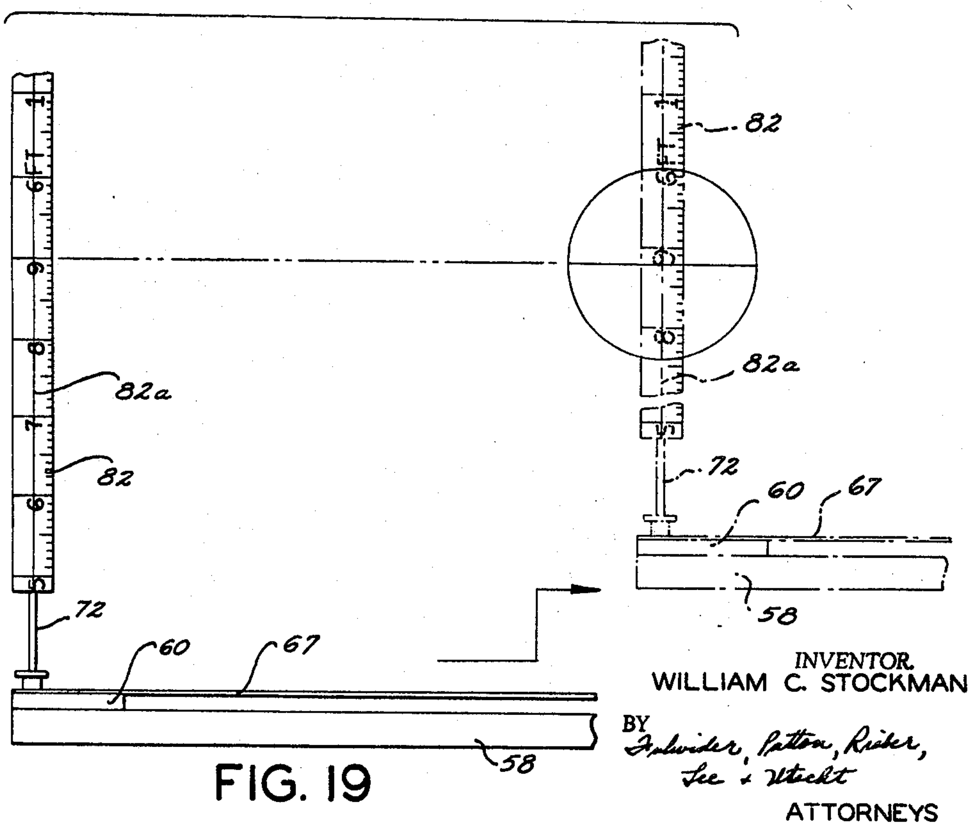
FIGURE 19 is a fragmentary side elevational view of the vertical linear measurement means, shown in several positions during adjustment of the form.

FIGURES 18 and 19 indicate the change in position of the setting gauge as it is used in adjusting the relative horizontal and vertical position of the several stations of the form. FIGURE 18 shows the entire gauge in solid lines following adjustment of the angular position of the second station, here station I. The gauge has been pre-set at station J, mounted at station I, and used to set the latter station at the proper angle. The broken line showing of FIGURE 18 indicates how station I has been moved to cause the gauge to be properly positioned in the eye piece of the instrument 160.

FIGURE 19 is a fragmentary view of the showing of FIGURE 18. This further shows how station I is adjusted to bring the scale 82 into the proper position within the eye piece of the instrument.

The next succeeding stations are then adjusted in like manner until all of the adjusting stations of the form are properly positioned. After this has been accomplished, the concrete can be poured into the form for providing the desired rail having the necessary curvatures.

As will be readily apparent to those persons skilled in the art, since adjusting mechanisms 134 and 144 are used to perform several adjustment operations, namely the angular and horizontal disposition of the particular adjustment station, it may be necessary to repeat some of the operations to insure that a preceding adjustment has not been disrupted by a succeeding adjustment. That is, in performing the horizontal positioning adjustment, the angular disposition of the particular station may be disrupted. Thus such angular adjustment should again be checked and suitable manipulation performed with mechanisms 134 and 144 to return the particular section to its proper angle of disposition.

It is thus seen that the present invention teaches the construction and operation of a gauge for properly setting a form in accordance with prior engineering calculations.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A gauge for establishing the locations of longitudinally spaced, successive stations on an elongated form relative to a vertical plane and relative to a horizontal plane, and also for establishing the angular inclination of said stations about a longitudinal reference axis, said gauge comprising:

a frame including means operative to detachably fix said frame to said elongated form at one of said stations;

an elongated, transversely oriented first arm mounted at its inner extremity to said frame for pivotal movement of said first arm about said longitudinal reference axis, said first arm including an extension portion extensible and retractable transversely of said longitudinal reference axis;

first indicator means carried by said frame and said arm and operative to indicate the angular inclination of said arm relative to said frame;

second indicator means carried by said first arm and scale operative to indicate the amount of extension of said extension portion necessary to effect a predetermined proximity thereof to said vertical plane;

a bubble level carried by said first arm to indicate horizontal orientation of said first arm;

an elongated, generally upwardly extending second arm mounted at its lower extremity to said extension portion of said first arm in perpendicular relation thereto, said second arm including an extension portion extensible and retractable along the longitudinal axis of said second arm; and third indicator means carried by said second arm and operative to indicate the amount of extension of said extension portion of said second arm necessary to effect a predetermined proximity thereof to said horizontal plane.

2. A gauge according to claim 1 wherein that portion of said frame mounted to said first arm and that portion of said frame adapted for attachment to said elongated form are pivotable relative to one another and about a generally vertically oriented axis passing through said longitudinal reference axis.

3. A gauge according to claim 1 wherein said second arm is mounted to said extension portion of said first arm for pivotal movement of said second arm about its longitudinal axis.

References Cited

UNITED STATES PATENTS

| | | | |
|---|---|---|---|
| 964,246 | 7/1910 | Hagan | 33—97 |
| 1,735,953 | 11/1929 | Clausen et al. | |
| 2,368,958 | 2/1945 | Williams | 33—93 |
| 2,575,697 | 11/1951 | Willis | 33—97 X |
| 2,770,042 | 11/1956 | Hone | 33—75 |
| 3,065,546 | 11/1962 | Brocklander | 33—75 |

SAMUEL S. MATTHEWS, *Primary Examiner.*